US012586254B2

(12) United States Patent
Aksoy et al.

(10) Patent No.: US 12,586,254 B2
(45) Date of Patent: Mar. 24, 2026

(54) HIGH-QUALITY RENDERING ON RESOURCE-CONSTRAINED DEVICES BASED ON VIEW OPTIMIZED RGBD MESH

(71) Applicant: Meta Platforms Technologies, LLC, Menlo Park, CA (US)

(72) Inventors: Volga Aksoy, Redwood City, CA (US); Zeyar Htet, San Mateo, CA (US); Reza Nourai, Danville, CA (US)

( * ) Notice: Subject to any disclaimer, the term of this patent is extended or adjusted under 35 U.S.C. 154(b) by 158 days.

(21) Appl. No.: 18/534,271

(22) Filed: Dec. 8, 2023

(65) Prior Publication Data

US 2024/0296590 A1 Sep. 5, 2024

Related U.S. Application Data

(60) Provisional application No. 63/480,963, filed on Jan. 21, 2023.

(51) Int. Cl.
| | |
|---|---|
| *G06T 9/00* | (2006.01) |
| *G06T 15/04* | (2011.01) |
| *G06T 15/20* | (2011.01) |
| *G06T 17/20* | (2006.01) |

(52) U.S. Cl.
CPC .............. *G06T 9/001* (2013.01); *G06T 15/04* (2013.01); *G06T 15/20* (2013.01); *G06T 17/205* (2013.01)

(58) Field of Classification Search
None
See application file for complete search history.

(56) References Cited

U.S. PATENT DOCUMENTS

| | | | |
|---|---|---|---|
| 12,256,098 B1 * | 3/2025 | Mammou | H04N 19/597 |
| 2015/0049201 A1 * | 2/2015 | Liu | H04L 12/1827 348/189 |

* cited by examiner

*Primary Examiner* — Nurun Flora
(74) *Attorney, Agent, or Firm* — Greenberg Traurig, LLP

(57) ABSTRACT

In one embodiment, a method includes receiving a first viewpoint associated with a head-mounted device from the head-mounted device, accessing a 3D mesh of a virtual scene, selecting a portion of the 3D mesh based on the first viewpoint, generating an image and a corresponding depth map of the virtual scene based on the selected portion of the 3D mesh, generating a simplified 3D mesh based on the depth map, wherein the simplified 3D mesh has fewer primitives than the selected portion of 3D mesh of the virtual scene, generating a texture for the simplified 3D mesh based on the image, and sending the simplified 3D mesh and the texture to the head-mount device, wherein the simplified 3D mesh and the texture are configured to be used for rendering the virtual scene from one or more viewpoints different from the first viewpoint.

20 Claims, 8 Drawing Sheets

Render Camera

Camera Frustum

Reprojection Camera
(same scene with camera translated slight left)

Camera Frustum

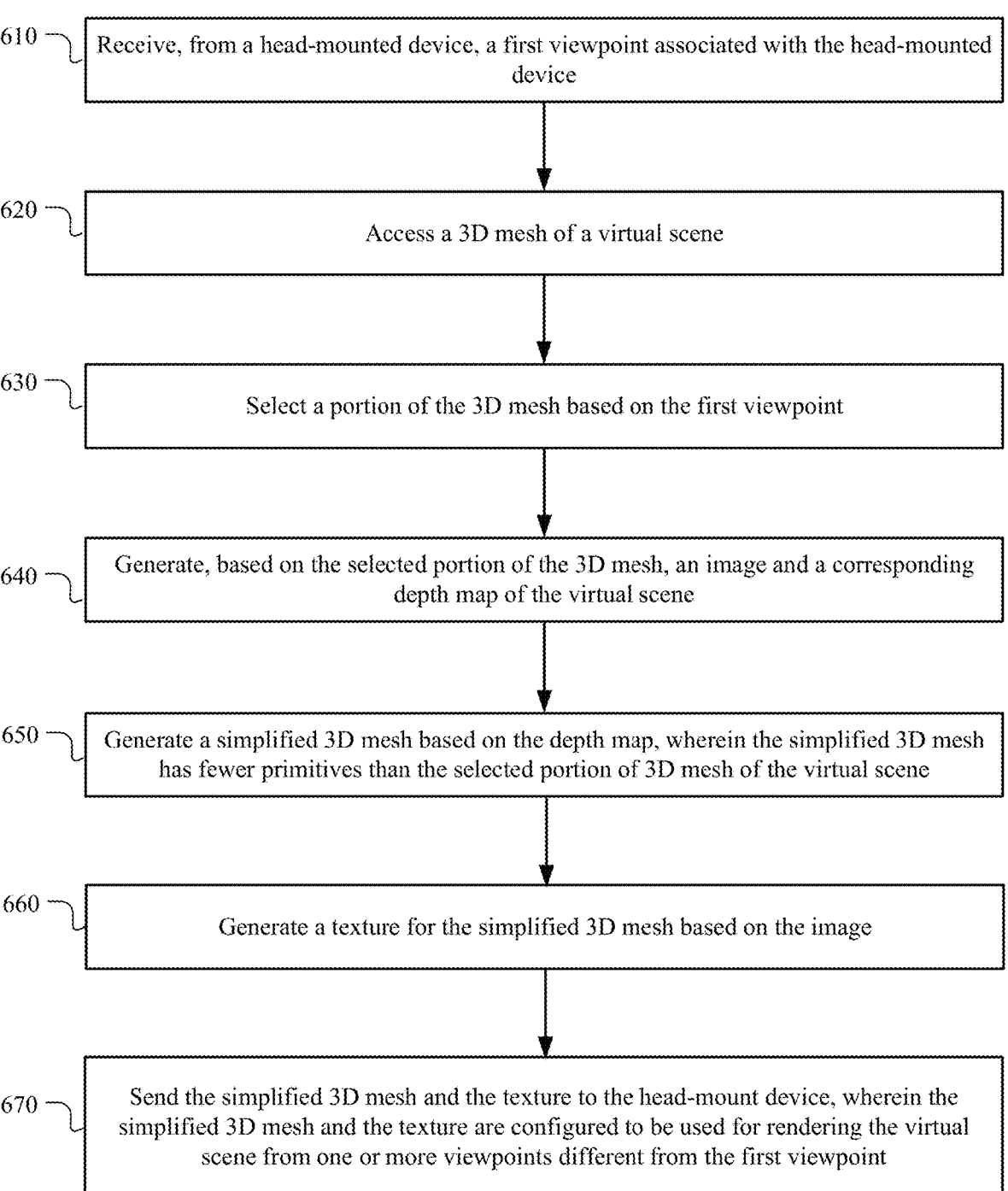

600

610 — Receive, from a head-mounted device, a first viewpoint associated with the head-mounted device 620 — Access a 3D mesh of a virtual scene 630 — Select a portion of the 3D mesh based on the first viewpoint 640 — Generate, based on the selected portion of the 3D mesh, an image and a corresponding depth map of the virtual scene 650 — Generate a simplified 3D mesh based on the depth map, wherein the simplified 3D mesh has fewer primitives than the selected portion of 3D mesh of the virtual scene 660 — Generate a texture for the simplified 3D mesh based on the image 670 — Send the simplified 3D mesh and the texture to the head-mount device, wherein the simplified 3D mesh and the texture are configured to be used for rendering the virtual scene from one or more viewpoints different from the first viewpoint

*FIG. 6*

HIGH-QUALITY RENDERING ON RESOURCE-CONSTRAINED DEVICES BASED ON VIEW OPTIMIZED RGBD MESH

PRIORITY

This application claims the benefit under 35 U.S.C. § 119(e) of U.S. Provisional Patent Application No. 63/480,963, filed 21 Jan. 2023, which is incorporated herein by reference.

TECHNICAL FIELD

This disclosure generally relates to systems and methods for content rendering.

BACKGROUND

Rendering or image synthesis is the process of generating a photorealistic or non-photorealistic image from a 2D or 3D model by means of a computer program. The resulting image is referred to as the render. Multiple models can be defined in a scene file containing objects in a strictly defined language or data structure. The scene file contains geometry, viewpoint, texture, lighting, and shading information describing the virtual scene. The data contained in the scene file is then passed to a rendering program to be processed and output to a digital image or raster graphics image file. The term "rendering" is analogous to the concept of an artist's impression of a scene. The term "rendering" is also used to describe the process of calculating effects in a video editing program to produce the final video output.

Rendering is one of the major sub-topics of 3D computer graphics, and in practice it is always connected to the others. It is the last major step in the graphics pipeline, giving models and animation their final appearance. With the increasing sophistication of computer graphics since the 1970s, it has become a more distinct subject. Rendering has uses in architecture, video games, simulators, movie and TV visual effects, and design visualization, each employing a different balance of features and techniques. A wide variety of renderers are available for use. Some are integrated into larger modeling and animation packages, some are standalone, and some are free open-source projects. On the inside, a renderer is a carefully engineered program based on multiple disciplines, including light physics, visual perception, mathematics, and software development.

SUMMARY OF PARTICULAR EMBODIMENTS

The embodiments disclosed herein may bring higher-quality content from a server to resource-constrained devices (client devices), such as virtual reality (VR), augmented reality (AR), and mixed reality (MR) headsets. In particular embodiments, a server may take the latest predicted pose of a head-mounted device (HMD) (i.e., client device) from the head-mounted device. The server may then render the scene from that point of view using its powerful GPU. The server may then encode the color buffer(s) using video compression (e.g., H265). The server may then generate a depth mesh from the depth buffer(s). The server may further package up the data and stream it to the client device. In particular embodiments, the client device may operate in two separate major CPU threads. At the rate the server provides the data, the client device may stream in the color buffers and depth meshes with the pose data used for during rendering, making them ready to be used for rendering. In addition, at native client refresh rate, the client device may render the latest available data it received from the server using the latest HMD pose. The embodiments disclosed herein may use cloud rendering while having scalable performance over several axes including cloud CPU and GPU performance, and a high tolerance to internet latency, low bandwidth and variable quality of service (QoS). The embodiments disclosed herein may achieve visual quality that is otherwise not attainable via conventional local rendering on today's head-mounted devices such as VR headsets. Although this disclosure describes rendering particular content by particular systems in a particular manner, this disclosure contemplates rendering any suitable content by any suitable system in any suitable manner.

In particular embodiments, a cloud-computing system may receive, from a head-mounted device, a first viewpoint associated with the head-mounted device. The cloud-computing system may then access a 3D mesh of a virtual scene. The cloud-computing system may select a portion of the 3D mesh based on the first viewpoint. In particular embodiments, the cloud-computing system may generate, based on the selected portion of the 3D mesh, an image and a corresponding depth map of the virtual scene. The cloud-computing system may then generate a simplified 3D mesh based on the depth map. In particular embodiments, the simplified 3D mesh may have fewer primitives than the selected portion of 3D mesh of the virtual scene. The cloud-computing system may further generate a texture for the simplified 3D mesh based on the image. In particular embodiments, the cloud-computing system may send the simplified 3D mesh and the texture to the head-mount device. The simplified 3D mesh and the texture may be configured to be used for rendering the virtual scene from one or more viewpoints different from the first viewpoint.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 illustrates an example method for rendering high-quality content on a head-mounted device.

DESCRIPTION OF EXAMPLE EMBODIMENTS

Figure 1A:
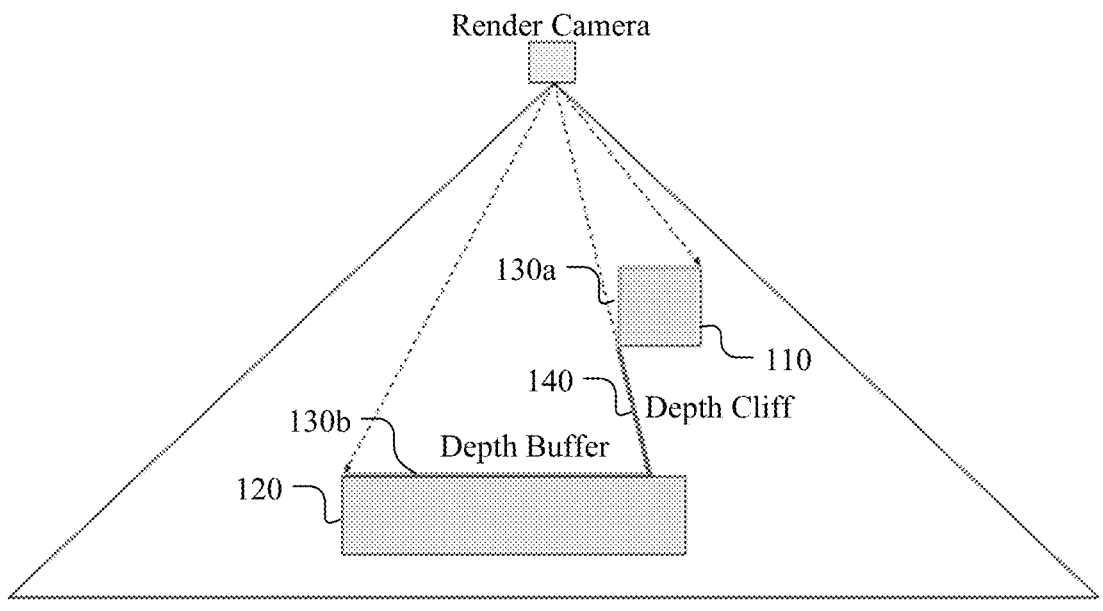
FIGS. 1A-1B illustrate an example diagram in view of a scene associated with depth buffer, depth cliff, and depth disocclusion.

The embodiments disclosed herein may bring higher-quality content from a server to resource-constrained devices (client devices), such as virtual reality (VR), augmented reality (AR), and mixed reality (MR) headsets. In particular embodiments, a server may take the latest predicted pose of a head-mounted device (HMD) (i.e., client device) from the head-mounted device. The server may then render the scene from that point of view using its powerful GPU. The server may then encode the color buffer(s) using video compression (e.g., H265). The server may then generate a depth mesh from the depth buffer(s). The server may further package up the data and stream it to the client device. In particular embodiments, the client device may operate in two separate major CPU threads. At the rate the server provides the data, the client device may stream in the color buffers and depth meshes with the pose data used for during rendering, making them ready to be used for rendering. In addition, at native client refresh rate, the client device may render the latest available data it received from the server using the latest HMD pose. The embodiments disclosed herein may use cloud rendering while having scalable performance over several axes including cloud CPU and GPU performance, and a high tolerance to internet latency, low bandwidth and variable quality of service (QoS). The embodiments disclosed herein may achieve visual quality that is otherwise not attainable via conventional local rendering on today's head-mounted devices such as VR headsets. Although this disclosure describes rendering particular content by particular systems in a particular manner, this disclosure contemplates rendering any suitable content by any suitable system in any suitable manner.

In particular embodiments, a cloud-computing system may receive, from a head-mounted device, a first viewpoint associated with the head-mounted device. The cloud-computing system may then access a 3D mesh of a virtual scene. The cloud-computing system may select a portion of the 3D mesh based on the first viewpoint. In particular embodiments, the cloud-computing system may generate, based on the selected portion of the 3D mesh, an image and a corresponding depth map of the virtual scene. The cloud-computing system may then generate a simplified 3D mesh based on the depth map. In particular embodiments, the simplified 3D mesh may have fewer primitives than the selected portion of 3D mesh of the virtual scene. The cloud-computing system may further generate a texture for the simplified 3D mesh based on the image. In particular embodiments, the cloud-computing system may send the simplified 3D mesh and the texture to the head-mount device. The simplified 3D mesh and the texture may be configured to be used for rendering the virtual scene from one or more viewpoints different from the first viewpoint.

With limited local power/resources on a head-mounted device, it may be hard to render high-quality objects locally. It may be preferable to render the objects on the server, but the server can only render and deliver frames at a slower frame rate (e.g., due to transmission latency) than the frame rate desired on the head-mounted device. Therefore, the server cannot simply render a single image that is ready to be displayed by the head-mounted device. Instead, the server may need to render an image plus a three-dimensional (3D) mesh to allow the head-mounted device to "re-project" (re-render) the scene by using the image as a texture for the mesh. For each frame of data provided by the server (e.g., image plus 3D mesh), the head-mounted device may render multiple frames based on the latest viewpoint of the user. The problem with this approach, however, may include that the 3D mesh of the object could be very large, making this process expensive or unscalable. To solve the aforementioned problem, instead of providing the raw/original mesh of the 3D object being rendered, the server in the embodiments disclosed herein may generate a simplified version of the mesh. The server may first get viewpoint information from the head-mounted device. The server may then select a portion of the 3D model that is visible to the user. The server may then render an image and depth map. The depth map may remove complexities of the triangles/mesh. The server may then use depth dilation to handle depth cliffs. The server may then generate a simple mesh that approximates the contour of the depth map. The server may then use tessellation techniques that approximate large flat areas with fewer triangles. The server may further compress the mesh and send it with the corresponding RGB data to the head-mounted device.

High-quality models may depict different potential use cases including CAD, art, fashion, gaming, and using physically based rendering techniques displayed to the user in a VR headset. In particular embodiments, a user may view such models via a VR headset. As an example and not by way of limitation, models may be positioned to appear on the meeting room desk in front of the user. For user interaction, the user may switch (e.g., in a predefined order) between the models by pressing the trigger button on a touch controller. By pressing a grab button on the touch controller, the user may also have a model smoothly rotate at a fixed rate. As expected, the user may move their head around the object to view it from any angle. When occluded by scenery, the model may depth clip as expected. In particular embodiments, a server renderer may use dynamic lighting and shadow to render content.

Particular embodiments may utilize RGBD techniques for rendering high-quality content on resource-constrained devices. RGBD techniques usually refer to the packing of color and depth information into a color buffer where D in RGBD refers to depth. In most incarnations, depth may be stored in the alpha channel of the color buffer or alongside it. However, in the embodiments disclosed herein, RGBD refers to the screen-space rendered color buffers and the accompanying depth mesh that is generated from the depth buffer obtained during rendering on the server. In particular embodiments, the server may utilize an algorithm to convert the depth buffer to an efficient depth mesh that looks like a height field.

Since depth mesh generation happens on the server (e.g., on GPU), the embodiments disclosed herein may use spare cycles on the server GPU to better optimize the mesh to work on the client device (e.g., VR headset) during reprojection. With the help of efficient vertex shaders on the client device (e.g., VR headset), the client device may render the depth mesh from different point of views as a means of "reprojection".

In particular embodiments, the server may handle depth cliff and perform depth disocclusion. Depth cliff is also called "depth discontinuity". Depth cliff may refer to the part of the depth buffer where there is a sudden jump in the depth values due to a transition from one polygon/triangle to another disconnected polygon/triangle. Depth cliff may happen to overlap from the render camera's point of view. When generating a depth mesh from a depth buffer, these regions may require special care as the mesh needs to accurately tessellate the depth mesh around these seams.

Depth disocclusion may happen around depth cliffs when dealing with reprojection techniques where the camera peaks around to uncover parts of the scene that were hidden due to overlapping objects. Depth disocclusion is an issue that requires special attention not just for reprojection techniques but also for many stereo rendering techniques. Depth disocclusion may often contain parts of the scene that were not rendered into one or more of the eye buffers. When trying to reproject previously rendered content, disocclusion regions may lack the information. As a result, sometimes one may need to make up plausible content that might fit those areas.

Figure 1B:
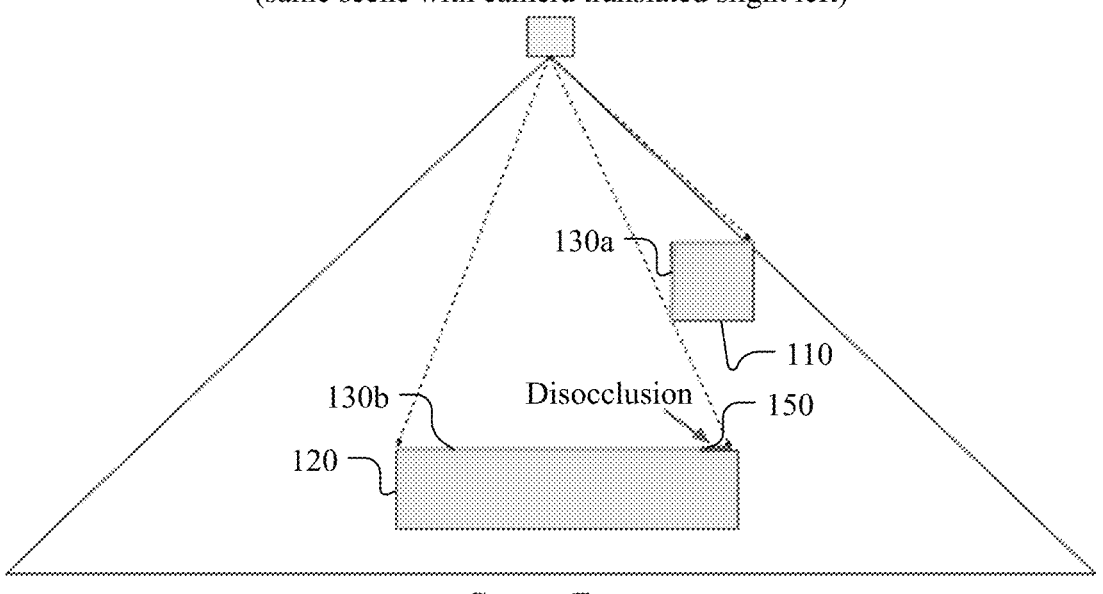

FIGS. 1A-1B illustrate an example diagram in view of a scene associated with depth buffer, depth cliff, and depth disocclusion. FIGS. 1A-1B show two situations in a simple diagram with a "top-down" view of a scene containing two boxes, e.g., box 110 and box 120. The outlines 130a-130b show the depth values that would be stored in the depth buffer. The region 140 denotes a "depth cliff". The region 150 shows the area that would show up as a "disocclusion region" needing special treatment for the reprojected camera view.

Figure 2:
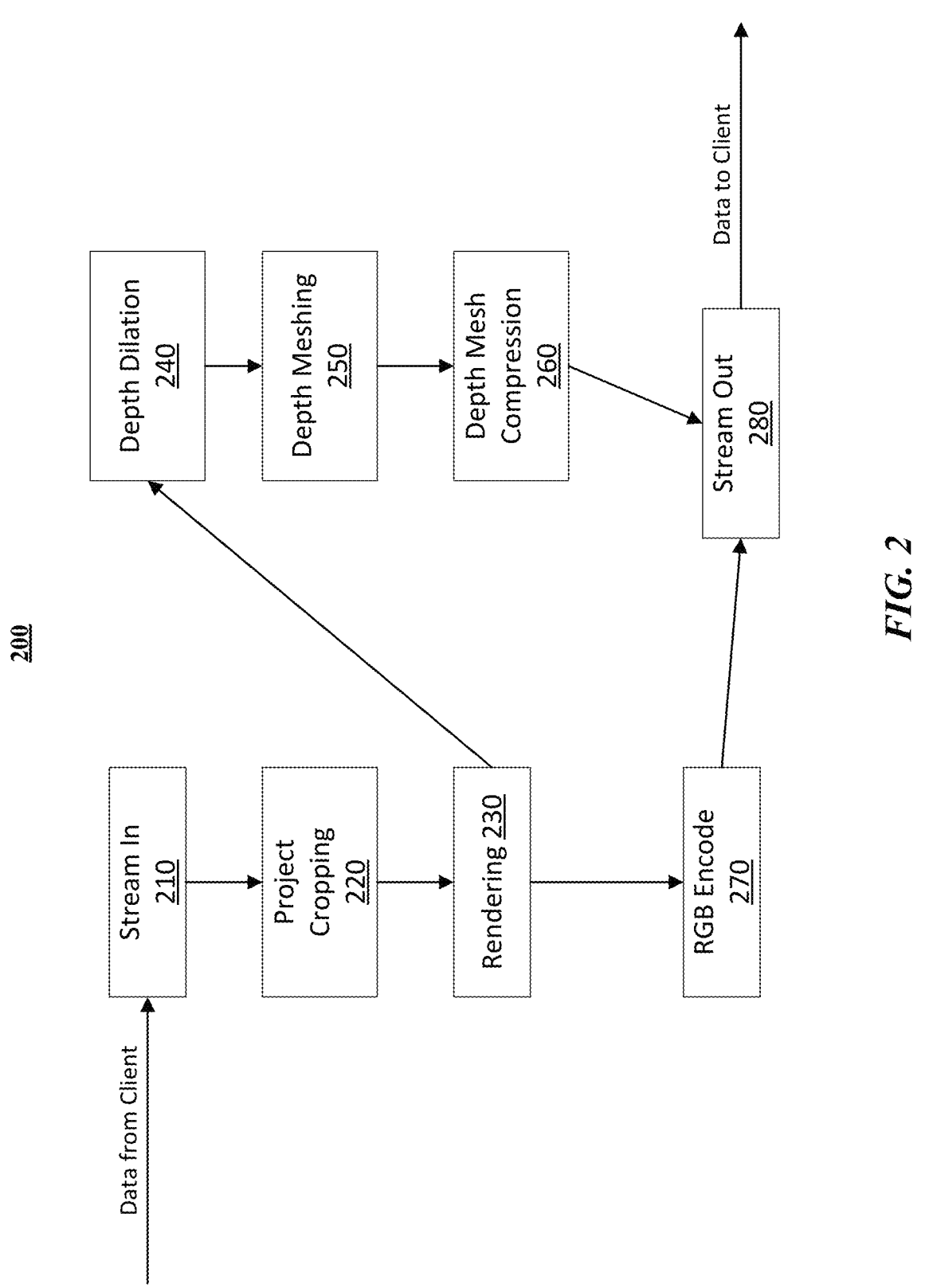
FIG. 2 illustrates an example diagram of server processing for rendering high-quality content.

FIG. 2 illustrates an example diagram 200 of server processing for rendering high-quality content. At block 210, the data may be streamed in from the client device to the server, e.g., via TCP/IP protocols. The data streamed in from the client may comprise all the information needed to make sure the server will have the parameters ready to render the scene. In particular embodiments, the data streamed in may predicted HMD pose and the related eye poses, the 3D model's local-to-world matrix in case the user is moving the model around either via touch controllers, or other means of animation, or other parameters such as the HMD's field-of-view (FOV) values per-eye, the identifier (ID) of the model/asset to render, etc. The head-mounted device may be worn by a user. Accordingly, the first viewpoint may be associated with one or more of a predicted pose associated with the head-mounted device and eye poses of the user corresponding to the predicted pose, a local-to-world matrix associated with the virtual scene, a field-of-view value associated with the head-mounted device corresponding to each eye of the user, or an identifier associated with the virtual scene.

In particular embodiments, lighting information may be also sent from the client to the server to be used for rendering. Since the lighting, shading and shadows are all dynamic, the server may use this information as long as the client application can extract the lighting information down to a select number of parameters (e.g., with an environment map) and send it to the server each time the lighting conditions change.

At block 220, the server may perform projection cropping. The cloud-computing system may crop a projection of the virtual scene by zooming into the virtual scene to fit the 3D mesh in a whole field of view of the head-mounted device. Since the 3D model being rendered in most cases may not fill the whole field of view of the viewer, the server may optimize the resolution of the frame being rendered to "zoom" into the model to keep it in frame, but also help improve the perceived resolution of the model when used on the client device (e.g., the VR headset). While there are various ways to achieve this, particular embodiments may implement this the following way. The server may render a low-resolution version of the asset (e.g., 128×128). The server may then calculate the minimum and maximum bounds of the asset in the frame for x-axis and y-axis. The server may then update the projection matrix to clamp the boundaries to these values. The server may further render the final model with the clamped projection matrix. While the aforementioned way may work well in almost all cases, some thin features (e.g., antenna on a model) may fail to rasterize any pixels in the low-resolution buffer, causing the algorithm to ignore said feature leading to cropping that is slightly too aggressive. In particular embodiments, the server may utilize techniques to mitigate this. As an example and not by way of limitation, these techniques may include using temporal jitter, multi-sample anti-aliasing (MSAA), analyzing the previous frame instead of rendering from low-resolution scratch, etc.

At block 230, the server may perform rendering. The rendering path for RGBD may be a custom coded physically-based-rendering (PBR) renderer using a cross-language, cross-platform application programming interface. Unlike conventional methods that render content into a texture atlas to do texture-space shading, the RGBD rendering path disclosed herein uses a screen space approach. In particular embodiments, the screen space approach may be based on 4×MSAA, SSAO (screen space ambient occlusion), real-time dynamic soft shadows. All of the rendering for the 3D model may be done using a single PBR shader. The renderer may help demonstrate that the embodiments disclosed herein can generate visuals that would be hard or impossible to attain at high framerates on a mobile-class system-on-chip (SoC) GPU.

For RGBD, the renderer may output stereo buffers which are baked into a side-by-side buffer later on. Each eye buffers' depth buffer may be also captured and fed into the next stage for further processing. In particular embodiments, the render resolution may be chosen as 1536×1536. When combined with the cropping feature, this resolution may be more than enough to achieve better than average PPD (pixels-per-degree) a native VR headset app achieves.

At block 240, the server may perform depth dilation. Depth buffers may be thought of as height fields like terrain maps. Such buffers may not handle what might be called "overhangs" where the expectation in a height field is that there is only one height value for a given value stored in the 2D data set. Similarly with depth buffers, given how depth testing works, if there is a part of a model that overlaps another part in screen space, the closer depth value may be kept in memory. As a result, in some cases one may have a depth cliff where there is a large depth discontinuity, going from one pixel to the on-screen neighbor. When a depth reprojected image is viewed from another angle, those depth cliffs may need special treatment. As an example and not by way of limitation, 3D photo feature may preprocess the image to generate geometry that uses blurred content of the backdrop pushed into those disocclusion regions. This may take time to process. In addition, when dealing with real-time rendered scenery, one may not have as much time to deal with this. To address these issues, particular embodiments may handle depth cliffs more efficiently using less expensive techniques. In particular embodiments, the cloud-computing system may apply depth dilation in each of one or more depth cliff regions.

When reprojecting an image using depth, if no special treatment to depth cliffs is performed, the disocclusion region may generate interpolated colors where the near and far away content is blended. This may lead to artifacts the eye can very easily spot because the nearby content may appear to smear into the background where it definitely does not belong. It may be more acceptable to instead only smear the further away content into the background region because in most cases the user may expect to see something that resembles the further away content in the disocclusion region anyway. To achieve this, the embodiments disclosed herein may make sure the nearby content does not even blend into the disocclusion region.

In particular embodiments, the server may make the depth values slightly dilated so that around a depth cliff region, the server may blend the nearby depth values slightly onto the further away content depth. This may help make sure that the blending during disocclusion only happens between two or more points all in the further away content, instead of taking any influence from the nearby region. In other words, applying the depth dilation in each of one or more depth cliff regions may comprise identifying one or more nearby points around the cliff region, where the nearby points are within a first threshold distance from the cliff region. Applying the depth dilation in each of one or more depth cliff regions may also comprise identifying one or more further-away points around the corresponding cliff region, where the further-away points are over a second threshold distance from the cliff region and the second threshold distance is larger than the first threshold distance. Applying the depth dilation in each of one or more depth cliff regions may further comprise blending depth values associated with the nearby points onto the further-away points. In one example embodiment, the server may use an algorithm that indiscriminately dilates depth everywhere. In another example embodiment, the server may use an algorithm that would stencil in only the depth cliff regions and only apply depth dilation in those areas.

In particular embodiments, the server may perform two types of depth dilation. The server may perform the two types of depth dilation both in pixel space, as well as depth mesh space. The depth pixel space dilation may make sure the depth values are slightly spread over the influence of the edge of the real edges. However, given the depth mesh resolution in the embodiments disclosed herein is sparser than the per-pixel depth, the server may also do a similar dilation in the depth mesh to be sure that the dilation influence is spread out.

Figure 3A:
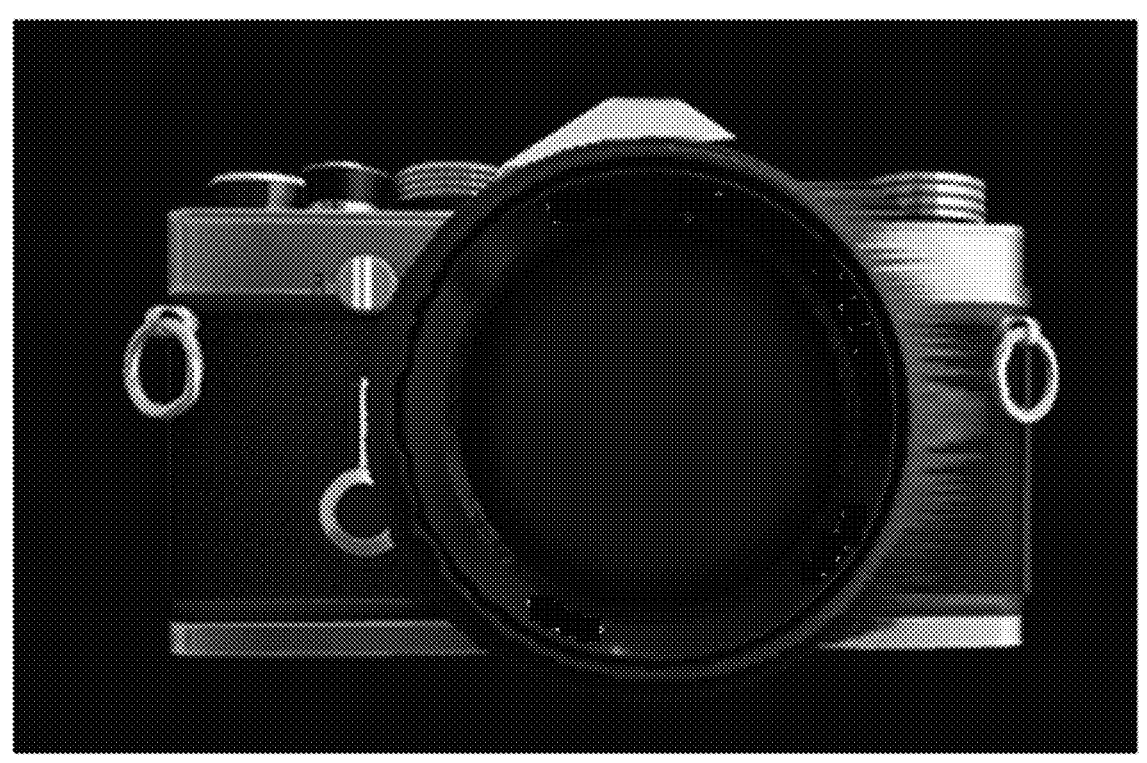
FIG. 3A illustrate example shearing.
Figure 3B:
FIG. 3B illustrate example effects of depth dilation during temporal reprojection.

FIG. 3A illustrate example shearing. The shearing occurred on the right side of the lens barrel when there is no depth dilation. FIG. 3B illustrate example effects of depth dilation during temporal reprojection. Shearing is effectively handled with depth dilation.

Referring back to FIG. 2, at block 250, the server may perform depth meshing. Depth meshing may be also referred as depth tessellation. Generating the simplified 3D mesh may be based on a tessellation algorithm. In particular embodiments, depth meshing may comprise a transformation from a 3D geometry to a 2D depth map and from the 2D depth map to a depth mesh. Particular embodiments may take into account the following factors when generating a depth mesh. The server may accurately cut out the 3D model for the depth mesh to be used as a coverage mask when it is finally rendered in virtual reality to help show the background. The depth mesh may work well with objects in front of it using relatively accurate depth. The server may make sure there is enough detail in the depth mesh where it matters, e.g., mainly around the borders of the model and depth cliffs (i.e., depth discontinuities). The server may not over-tessellate to make sure the poly count remains low to avoid a large performance hit. The server may also tessellate enough to have the right amount of tessellation for curves, bumpy, noisy surfaces so that depth reprojection quality remains high in virtual reality.

In particular embodiments, the server may tessellate every time the model renders because the server may not track if the model has moved in the scene, animated, or how the head-mounted device (and eye poses) have moved in the scene. The server may re-tessellate the whole frame after each render.

In particular embodiments, the server may generate the depth mesh as follows. The server may first generate a depth MIP chain from the source depth buffer. Starting with the coarsest MIP level, the server may determine how much depth deviation there would be using a corresponding coarse MIP representation versus a more detailed one. The server may further select the coarsest MIP level that would have good performance representing the depth complexity in the tile. Using the chosen MIP tiles, the server may propagate the MIP levels outwards to make sure there is never a transition of more than one level between neighboring tiles. In particular embodiments, the server may select one of a plurality of (e.g., 16) tessellation patterns needed by analyzing the neighbors' connectivity. The server may snap the edge vertices to better follow the contours of the model on the boundaries, which may help avoid creating 1×1 pixel triangles along the edges and make the mesh to finely traverse the edges of the object.

In other words, generating the simplified 3D mesh may comprise generating a depth MIP chain from the depth map, where the depth MIP chain comprises a plurality of MIP levels. Generating the simplified 3D mesh may also comprise determining a particular MIP level among the plurality of MIP levels to represent depth complexity associated with a particular tile corresponding to that MIP level. Generating the simplified 3D mesh may additionally comprise using the particular tile to propagate the MIP level of that particular tyle outwards to one or more neighboring tiles, where a transition between any two of the particular tile and the neighboring tiles is no greater than one MIP level. Generating the simplified 3D mesh may further comprise selecting a particular tessellation pattern from a plurality of predetermined tessellation patterns to analyzing neighbor connectivity and snapping edge vertices on boundaries between the particular tile and the neighboring tiles based on one or more contours of the portion of the 3D mesh.

Once tessellation is done, the server may finalize the mesh buffers as follows. The server may first generate an indexed vertex buffer where shared vertices are not sent as independent triangles. To do this, the server may employ a bucketing technique where identical positions are assumed to be the same vertex. Then the index buffer may be built from these new shared vertices. In other words, generating an indexed vertex buffer may comprise identifying one or more identical triangles of the simplified 3D mesh, assigning a shared vertex to the identical triangles, and generating the indexed vertex buffer based on the shared vertex.

Finally, using the neighboring information calculated in the bucketing stage, the server may dilate the stored values to the neighbors on the depth mesh using a depth dilation algorithm similarly to the manner of depth dilation in the pixel space as previously described. In other words, the cloud-computing system may apply depth dilation in each of identical triangles. At this point, the server may have a tessellated and vertex plus index buffer to be passed into the compression stage.

Figure 4A:
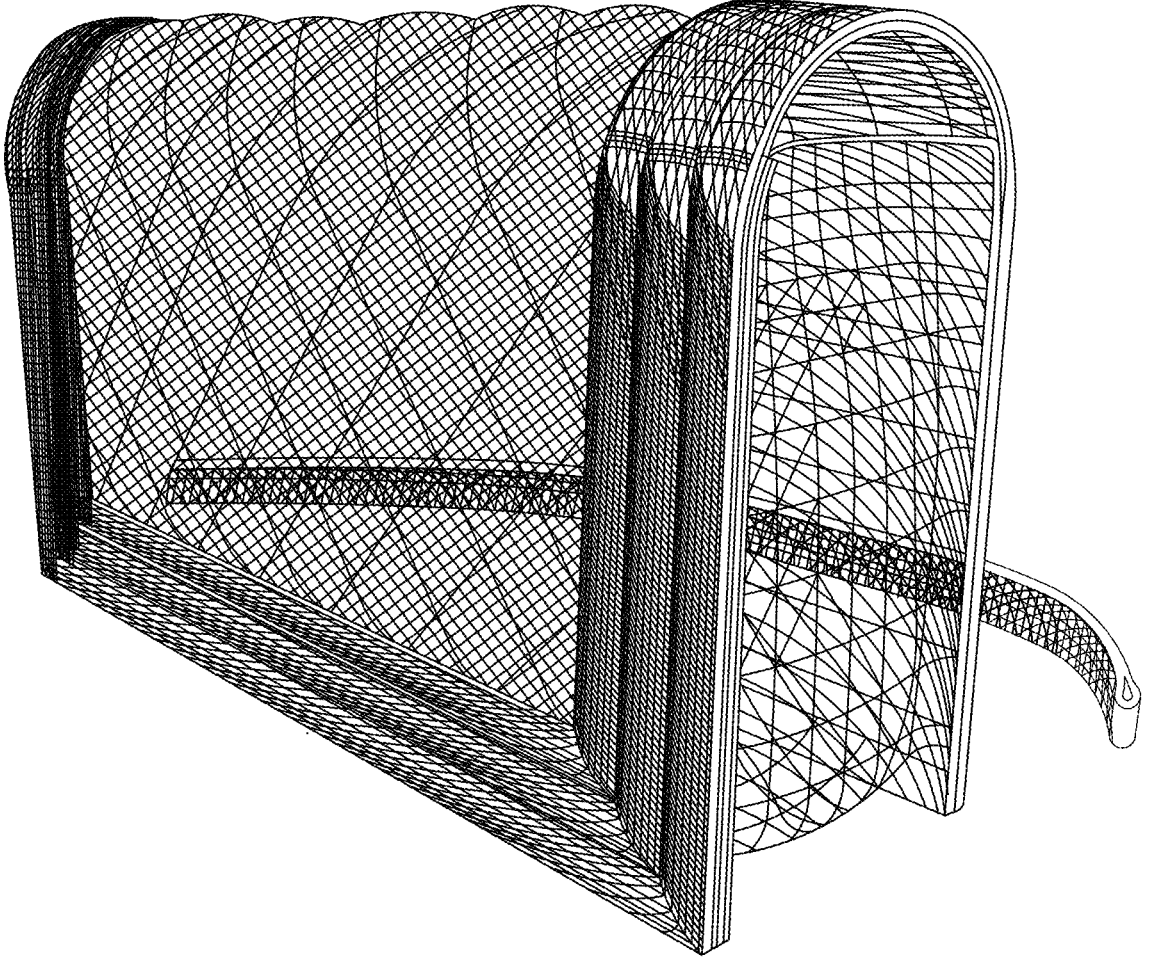
FIGS. 4A-4B illustrate an example comparison of tessellated depth mesh and original triangle mesh.
Figure 4B:
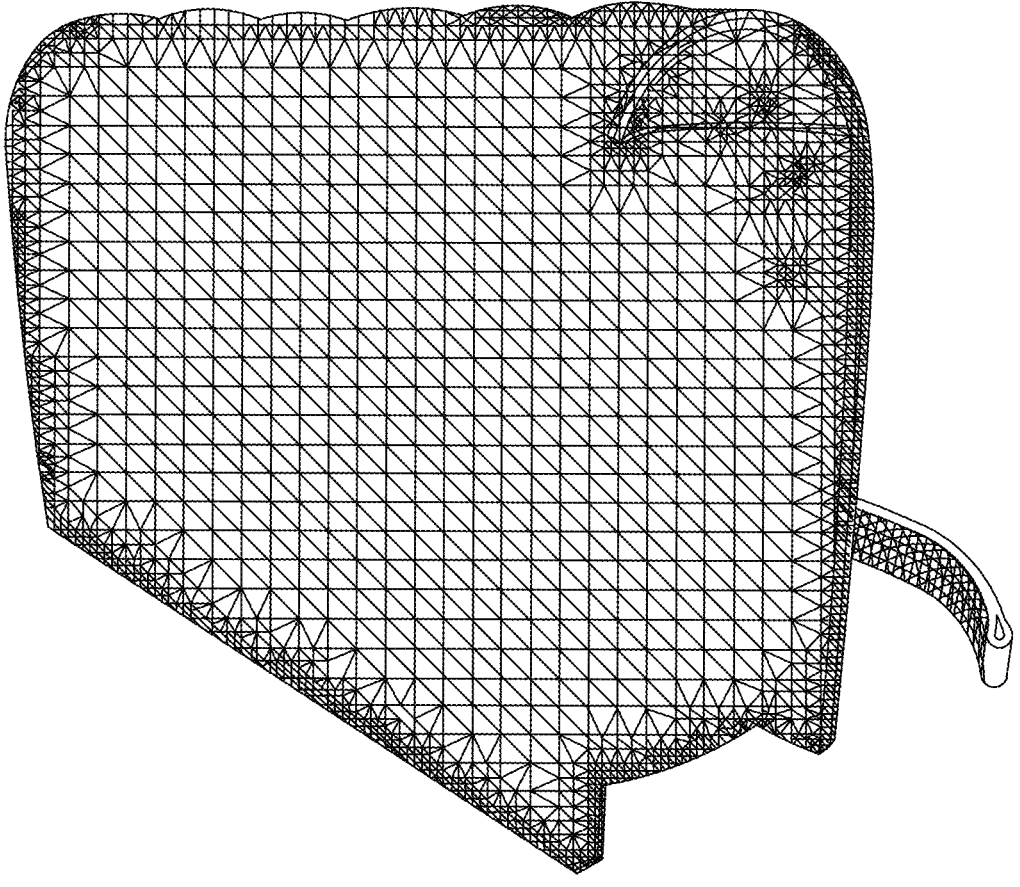

FIGS. 4A-4B illustrate an example comparison of tessellated depth mesh and original triangle mesh. FIG. 4A shows the original triangle mesh of the source model associated with a purse. FIG. 4B shows the tessellated simplified depth mesh of the purse. As can be seen, there are much fewer primitives (triangles) in the tessellated simplified depth mesh of the purse than original triangle mesh of the source model associated with the purse.

Referring back again to FIG. 2, at block 260, the server may perform depth mesh compression. The cloud-computing system may generate a compressed 3D mesh from the simplified 3D mesh. Depth mesh compression may help reduce data rate and improve latency. For depth mesh compression, the server may use a fast way to compress on the server with a fast decompression on the head-mounted device to avoid adding too much latency to the pipeline. As a result, the compression used may not be too complicated to remain performant. In one embodiment, the depth mesh compression may be based on a lossy compression that utilizes the screen space nature of the mesh to enable a compact compression while still maintaining visual parity. The geometry representation may follow the traditional mesh representation using triangles. As an example and not by way of limitation, each vertex may be defined by three values, e.g., x, y, and. x and y define the screen space position of the vertex, while d is projected depth of the vertex. There is no need for the two-dimensional texture coordinates that correspond with the vertex information for the geometry since the server can utilize the screen space x/y to calculate these coordinates to sample the RGB from, thereby saving bandwidth.

In particular embodiments, d may be represented by a half-float (reason for lossiness). x and y may be represented by the screen position and hence offering a much more compact representation using their integral pixel location form. In addition, the server may also index the mesh, resulting in a 2× compression ratio. In particular embodiments, the server may further utilize sub-meshes where if the number of vertices exceeds 64 k, the server may split up the mesh into multiple sub-meshes. This may allow the server to use 16-bit indices, which may further reduce the total bandwidth taken.

In particular embodiments, the depth mesh compression may take about 1-2 ms to encode on the server and about 1 ms to decode on the client system. While the bandwidth fluctuates based on the asset, it may range from 8 to 15 Mbps. In particular embodiments, the server may further reduce the bandwidth. As an example and not by way of limitation, the server may use stereo based delta's to compress left and right eye meshes more efficiently as well as ways to extract intra-frame delta's for the meshes. In addition, the limited depth range of models may also be utilized to reduce the footprint more.

Note that the depth processing (i.e., blocks 240-260) may be independent of the RGB data. While the RGB data and depth data need to be synchronized with one another, after the scene is rendered, they may be processed and compressed independently.

At block 270, the server may perform RGB encode. The other data component which is transferred from the server to the client is the RGB data. In particular embodiments, the server may compress and transmit RGB data using a video stream, e.g., using high efficiency video coding (HEVC). In other words, the cloud-computing system may encode the image and send the encoded image to the head-mount device. In particular embodiments, the encoded image may be configured to be used for rendering the virtual scene from the one or more viewpoints different from the first viewpoint.

In particular embodiments, the server may encode the eye stereo pair side by side within the same texture. In terms of video codec settings, the server may use a single I-frame with the rest being p-frames to minimize bandwidth. As a result, the server may use reliable transport to avoid video stream corruption. In terms of implementation, since the video encode is a different hardware unit on the GPU, the server may encode the video in parallel to compressing the mesh data to help reduce the pipeline latency.

Referring back to FIG. 2, at block 280, the server may stream out data to the client. As an example and not by way of limitation, for data transmission, the server may use TCP/IP as the network protocol. Other communication protocols may work as well. As another example and not by way of limitation, the server may use UDP as the network protocol. In addition, since the server uses only p-frames for the video stream to minimize bandwidth, the server may use reliable transport. In particular embodiments, the network transmission may be executed on a separate network thread to ensure it doesn't block any GPU rendering or CPU compression.

In particular embodiments, the data streamed to the client may include RGB texture data in the form of a video stream, depth geometry data in the form of an indexed mesh, view and projection matrix for each eye that the mesh and texture is generated from, control/metadata about the type of compression used and the number of sub-meshes, etc.

In particular embodiments, the head-mounted device may be worn by a user. The cloud-computing system may generate a view and projection matrix for each eye of the user. The cloud-computing system may further send the view and projection matrix for each eye of the user to the head-mounted device. In particular embodiments, the view and projection matrix for each eye of the user may be configured to be used for rendering the virtual scene from the one or more viewpoints different from the first viewpoint.

In particular embodiments, generating the compressed 3D mesh may be based on a particular type of compression. Accordingly, the cloud-computing system may send metadata associated with the particular type of compression to the head-mount device. In particular embodiments, the metadata associated with the particular type of compression may be configured to be used for rendering the virtual scene from the one or more viewpoints different from the first viewpoint.

Figure 5:
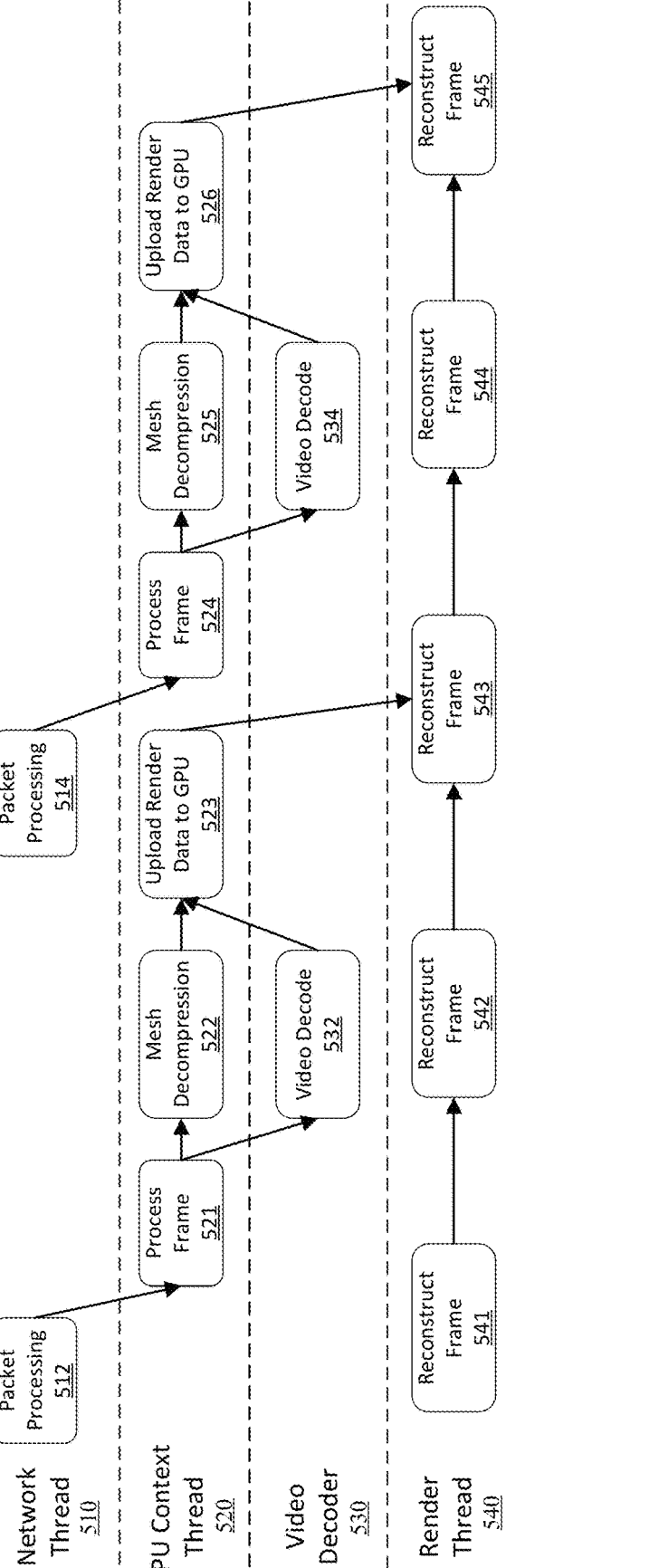
FIG. 5 illustrates an example flow diagram for client processing.

FIG. 5 illustrates an example flow diagram 500 for client processing. The client processing may be in parallel with the server processing. The pipeline of client processing is set up in a way that the GPU, CPU and video decoder may be all pipelined in an efficient manner. The incoming data stream may be handled on a dedicated network thread 510. The main responsibility of the network thread 510 may be to process network packets and usher each data payload to the proper subcomponent in the GPU context thread 520 to handle. As shown in FIG. 5, the network thread 510 may perform packet processing 512 for a current packet. The GPU context thread may process frame 521 based on the processed packet received from the network thread 510. The GPU context thread 520 may then perform mesh decompression 522 on the processed frame. The large screen space an object takes, the longer the decompression may take.

As describe previously, the server may use an indexed mesh with sub-meshes to guarantee the usage of 16-bit indices combined with per vertex compression to send the mesh data. In some embodiments, one may decode this data stream and render directly as an indexed mesh. However, in certain cases where the render doesn't have the concept of per eye meshes, one may be unable to easily render an indexed mesh per eye. Hence, particular embodiments may expand the indexed mesh into a triangle stream and render using regular triangles.

In particular embodiments, the processed frame may be also provided for video decode 532 of video decoder 530. Video decoder 530 may be selected from commonly available libraries. As an example and not by way of limitation, OpenMAX library may be used to decode video stream. This may allow one to have the most control and least latency, but with a slight added complication of coding against the library. In addition, particular embodiments may also either add the application to the whitelist of the operating system or run certain commands to allow the application to directly access the OpenMAX layers. In an example embodiment, the output of the OpenMAX library may comprise a texture in NV12 format. The NV12 format may be a yuv420 texture with two planes. The first plane may be a texture for luminance of width (denoted by w) and height (denoted by h), while the second plane may be a texture with interleaved red and blue chrominance channel with width w/2 and height h/2. In particular embodiments, the client may perform an intermediate blit function to RGB, so that certain render may use the texture properly.

The decoded frame from video decode 532 may be provided to the GPU context thread 520. At block 523, the GPU context thread 520 may upload render data including both the decompressed mesh and decode frame to GPU for rendering and reprojection.

Illustrated as reconstruct frame 543 in FIG. 5, the rendering on the client may be as follow. The input to the render thread 540 may be a mesh with a single texture. The crux of the vertex shader may involve taking the vertices of the mesh, back projecting using the mesh, view and projection matrix passed from the server to go back into world positions and then projecting those vertices into the current view pose on the head-mounted device.

In particular embodiments, the render thread 540 may utilize additional logic to handle left and right eye vertices based on vertex identifier since we are packing them into the same vertex stream. However, these may be removed if the render properly supports per-eye mesh. As for the fragment shader, the render thread may use a single texture lookup to shade the fragment. As a result, the runtime performance cost may be small compared to rendering the actual model locally.

To allow easier integrations with client applications and game engines, particular embodiments may create a reconstruction library. The components in this library may include network stack for communication with server and packet processing, logic for mesh decompression, logic for interacting with mobile decoder using commonly available libraries to decode video streams, collecting metrics for client reconstruction and sending them to the server, and GPU reconstruction logic. Due to the generation of a mesh and texture used for reconstruction, the library's reconstruction logic may be optional since the application may decide to draw the mesh itself for better control.

As illustrated in FIG. 5, reconstruct frame 543 is based on render data provided by GPU context thread 520 as well as prior reconstructed frame 542, which is based on prior reconstructed frame 541. In other words, each decoded frame on the client may be also reused by the render thread 540 (together with the latest pose) to generate views over multiple frames.

In a similarly manner, the next incoming packet may go through packet processing 514, process frame 524, video decode 534, mesh decompression 525, upload render data to GPU 526, and reconstruct frame 544.

FIG. 6 illustrates an example method 600 for rendering high-quality content on a head-mounted device. The method may begin at step 610, where the cloud-computing system may receive, from a head-mounted device, a first viewpoint associated with the head-mounted device. At step 620, the cloud-computing system may access a 3D mesh of a virtual scene. At step 630, the cloud-computing system may select a portion of the 3D mesh based on the first viewpoint. At step 640, the cloud-computing system may generate, based on the selected portion of the 3D mesh, an image and a corresponding depth map of the virtual scene. At step 650, the cloud-computing system may generate a simplified 3D mesh based on the depth map, wherein the simplified 3D mesh has fewer primitives than the selected portion of 3D mesh of the virtual scene. At step 660, the cloud-computing system may generate a texture for the simplified 3D mesh based on the image. At step 670, the cloud-computing system may send the simplified 3D mesh and the texture to the head-mount device, wherein the simplified 3D mesh and the texture are configured to be used for rendering the virtual scene from one or more viewpoints different from the first viewpoint. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for rendering high-quality content on a head-mounted device including the particular steps of the method of FIG. 6, this disclosure contemplates any suitable method for rendering high-quality content on a head-mounted device including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
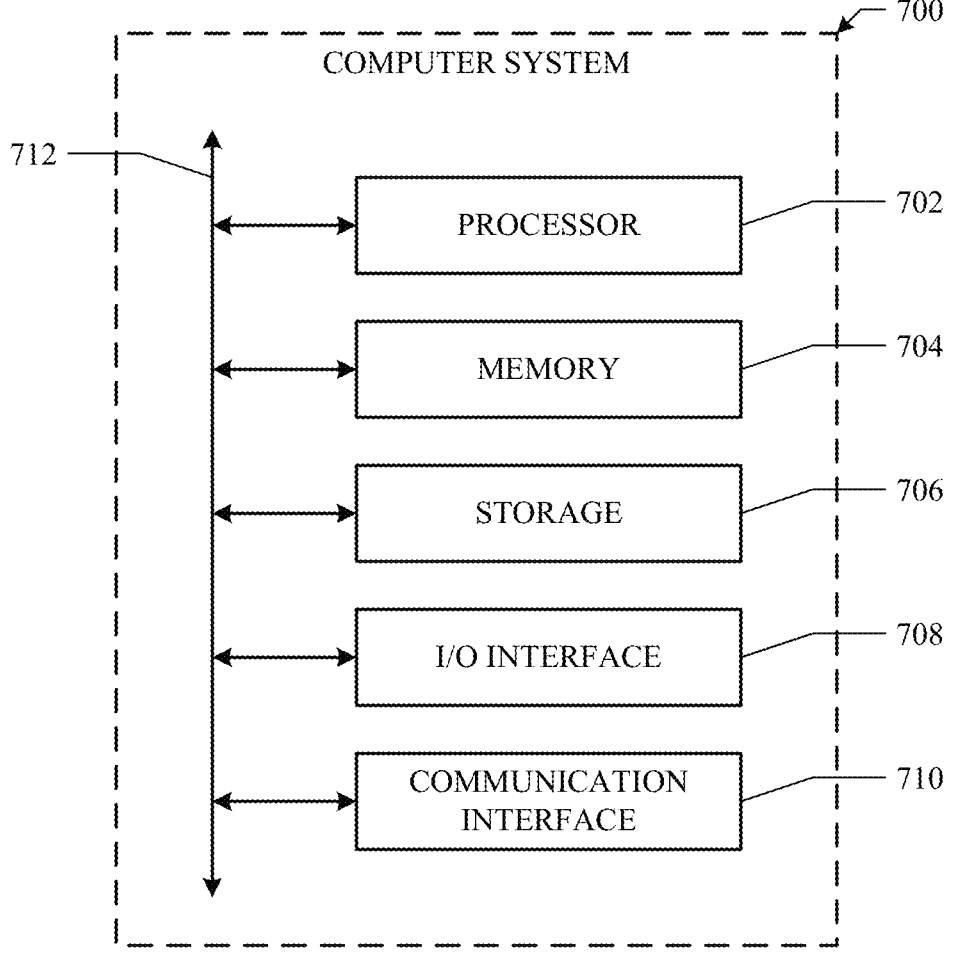
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a cloud-computing system:
   receiving, from a head-mounted device, a first viewpoint associated with the head-mounted device;
   accessing a 3D mesh of a virtual scene;
   selecting a portion of the 3D mesh based on the first viewpoint;
   generating, based on the selected portion of the 3D mesh, an image and a corresponding depth map of the virtual scene that includes one or more depth cliff regions;
   applying depth dilation in each of the one or more depth cliff regions at least in part by identifying one or more nearby points around a depth cliff region that are within a first threshold distance from the depth cliff region and identifying one or more further-away points around the depth cliff region that are over a second threshold distance from the depth cliff region;

generating a simplified 3D mesh based on the depth map, wherein the simplified 3D mesh has fewer primitives than the selected portion of 3D mesh of the virtual scene;

generating a texture for the simplified 3D mesh based on the image; and sending the simplified 3D mesh and the texture to the head-mounted device, wherein the simplified 3D mesh and the texture are configured to be used for rendering the virtual scene from one or more viewpoints different from the first viewpoint.

2. The method of claim 1, wherein the second threshold distance is larger than the first threshold distance.

3. The method of claim 2, wherein applying the depth dilation in each of one or more depth cliff regions further comprises:

blending depth values associated with the nearby points onto the further-away points.

4. The method of claim 1, wherein generating the simplified 3D mesh is further based on a tessellation algorithm, comprising:

generating a depth MIP chain from the depth map, wherein the depth MIP chain comprises a plurality of MIP levels;

determining a particular MIP level among the plurality of MIP levels to represent depth complexity associated with a particular tile corresponding to that MIP level;

using the particular tile to propagate the MIP level of that particular tyle outwards to one or more neighboring tiles, wherein a transition between any two of the particular tile and the neighboring tiles is no greater than one MIP level;

selecting a particular tessellation pattern from a plurality of predetermined tessellation patterns to analyzing neighbor connectivity; and snapping edge vertices on boundaries between the particular tile and the neighboring tiles based on one or more contours of the portion of the 3D mesh.

5. The method of claim 1, further comprising:

generating an indexed vertex buffer, comprising:

identifying one or more identical triangles of the simplified 3D mesh;

assigning a shared vertex to the identical triangles; and generating the indexed vertex buffer based on the shared vertex.

6. The method of claim 5, further comprising:

applying depth dilation in each of identical triangles.

7. The method of claim 1, further comprising:

generating a compressed 3D mesh from the simplified 3D mesh.

8. The method of claim 7, wherein generating the compressed 3D mesh is based on a particular type of compression, and wherein the method further comprises:

sending metadata associated with the particular type of compression to the head-mounted device, wherein the metadata associated with the particular type of compression is configured to be used for rendering the virtual scene from the one or more viewpoints different from the first viewpoint.

9. The method of claim 1, wherein the head-mounted device is worn by a user, and wherein the method further comprises:

generating a view and projection matrix for each eye of the user; and sending the view and projection matrix for each eye of the user to the head-mounted device, wherein the view and projection matrix for each eye of the user is configured to be used for rendering the virtual scene from the one or more viewpoints different from the first viewpoint.

10. The method of claim 1, further comprising:

encoding the image; and sending the encoded image to the head-mounted device, wherein the encoded image is configured to be used for rendering the virtual scene from the one or more viewpoints different from the first viewpoint.

11. The method of claim 1, wherein the head-mounted device is worn by a user, and wherein the first viewpoint is associated with one or more of:

a predicted pose associated with the head-mounted device and eye poses of the user corresponding to the predicted pose;

a local-to-world matrix associated with the virtual scene;

a field-of-view value associated with the head-mounted device corresponding to each eye of the user; or an identifier associated with the virtual scene.

12. The method of claim 1, further comprising:

cropping a projection of the virtual scene by zooming into the virtual scene to fit the 3D mesh in a whole field of view of the head-mounted device.

13. One or more computer-readable non-transitory storage media embodying software that is operable when executed to:

receive, from a head-mounted device, a first viewpoint associated with the head-mounted device;

access a 3D mesh of a virtual scene;

select a portion of the 3D mesh based on the first viewpoint;

generate, based on the selected portion of the 3D mesh, an image and a corresponding depth map of the virtual scene that includes one or more depth cliff regions;

applying depth dilation in each of the one or more depth cliff regions at least in part by identifying one or more nearby points around a depth cliff region that are within a first threshold distance from the depth cliff region and identifying one or more further-away points around the depth cliff region that are over a second threshold distance from the depth cliff region;

generate a simplified 3D mesh based on the depth map, wherein the simplified 3D mesh has fewer primitives than the selected portion of 3D mesh of the virtual scene;

generate a texture for the simplified 3D mesh based on the image; and send the simplified 3D mesh and the texture to the head-mounted device, wherein the simplified 3D mesh and the texture are configured to be used for rendering the virtual scene from one or more viewpoints different from the first viewpoint.

14. The media of claim 13, wherein the second threshold distance is larger than the first threshold distance.

15. The media of claim 14, wherein applying the depth dilation in each of one or more depth cliff regions further comprises:

blending depth values associated with the nearby points onto the further-away points.

16. The media of claim 13, wherein generating the simplified 3D mesh is further based on a tessellation algorithm, comprising:

generating a depth MIP chain from the depth map, wherein the depth MIP chain comprises a plurality of MIP levels;

determining a particular MIP level among the plurality of MIP levels to represent depth complexity associated with a particular tile corresponding to that MIP level;

using the particular tile to propagate the MIP level of that particular tyle outwards to one or more neighboring tiles, wherein a transition between any two of the particular tile and the neighboring tiles is no greater than one MIP level;

selecting a particular tessellation pattern from a plurality of predetermined tessellation patterns to analyzing neighbor connectivity; and snapping edge vertices on boundaries between the particular tile and the neighboring tiles based on one or more contours of the portion of the 3D mesh.

17. A system comprising: one or more processors; and a non-transitory memory coupled to the processors comprising instructions executable by the processors, the processors operable when executing the instructions to:

receive, from a head-mounted device, a first viewpoint associated with the head-mounted device;

access a 3D mesh of a virtual scene that includes one or more depth cliff regions;

applying depth dilation in each of the one or more depth cliff regions at least in part by identifying one or more nearby points around a depth cliff region that are within a first threshold distance from the depth cliff region and identifying one or more further-away points around the depth cliff region that are over a second threshold distance from the depth cliff region;

select a portion of the 3D mesh based on the first viewpoint;

generate, based on the selected portion of the 3D mesh, an image and a corresponding depth map of the virtual scene;

generate a simplified 3D mesh based on the depth map, wherein the simplified 3D mesh has fewer primitives than the selected portion of 3D mesh of the virtual scene;

generate a texture for the simplified 3D mesh based on the image; and send the simplified 3D mesh and the texture to the head-mounted device, wherein the simplified 3D mesh and the texture are configured to be used for rendering the virtual scene from one or more viewpoints different from the first viewpoint.

18. The system of claim 17, wherein the second threshold distance is larger than the first threshold distance.

19. The system of claim 18, wherein applying the depth dilation in each of one or more depth cliff regions further comprises:

blending depth values associated with the nearby points onto the further-away points.

20. The system of claim 17, wherein generating the simplified 3D mesh is further based on a tessellation algorithm, comprising:

generating a depth MIP chain from the depth map, wherein the depth MIP chain comprises a plurality of MIP levels;

determining a particular MIP level among the plurality of MIP levels to represent depth complexity associated with a particular tile corresponding to that MIP level;

using the particular tile to propagate the MIP level of that particular tyle outwards to one or more neighboring tiles, wherein a transition between any two of the particular tile and the neighboring tiles is no greater than one MIP level;

selecting a particular tessellation pattern from a plurality of predetermined tessellation patterns to analyzing neighbor connectivity; and snapping edge vertices on boundaries between the particular tile and the neighboring tiles based on one or more contours of the portion of the 3D mesh.

* * * * *